United States Patent [19]

Brandt

[11] 4,371,052

[45] Feb. 1, 1983

[54] ANTI-THEFT DEVICE FOR MOTOR VEHICLES

[75] Inventor: Warren J. Brandt, Burbank, Calif.

[73] Assignee: O. C. Jenkins, Santa Ana, Calif.

[21] Appl. No.: 135,272

[22] Filed: Mar. 31, 1980

[51] Int. Cl.³ .............................................. B60R 25/00
[52] U.S. Cl. ................................ 180/287; 307/10 AT
[58] Field of Search ............... 180/271, 272, 286, 287, 180/289; 307/10 AT

[56] References Cited

U.S. PATENT DOCUMENTS

| | | | |
|---|---|---|---|
| 2,876,856 | 3/1959 | Greene | 180/286 |
| 3,354,980 | 11/1967 | Nielsen | 180/287 |
| 3,453,591 | 7/1969 | Perez | 180/289 |
| 3,544,804 | 12/1970 | Gaumer et al. | 307/10 AT |
| 3,691,396 | 9/1972 | Hinrichs | 180/114 X |
| 3,750,430 | 8/1973 | Crise | 70/1.5 |
| 3,818,436 | 6/1974 | Hong | 307/10 AT X |
| 3,858,175 | 12/1974 | Kopera, Jr. | 307/10 AT X |
| 3,930,226 | 12/1975 | Plumberg | 307/10 AT X |
| 4,064,547 | 12/1977 | Zagwyn | 307/10 AT X |
| 4,107,543 | 8/1978 | Kaplan | 307/10 AT |

Primary Examiner—Joseph F. Peters, Jr.
Assistant Examiner—Donald W. Underwood
Attorney, Agent, or Firm—Robert T. Merrick

[57] ABSTRACT

An anti-theft device for motor vehicles in which the ignition is rendered inoperable by a relay-operated means and the setting of certain pre-determined accessory switches in the on position and certain other pre-determined accessory switches in the off position activates the relay to render the ignition operable.

12 Claims, 2 Drawing Figures

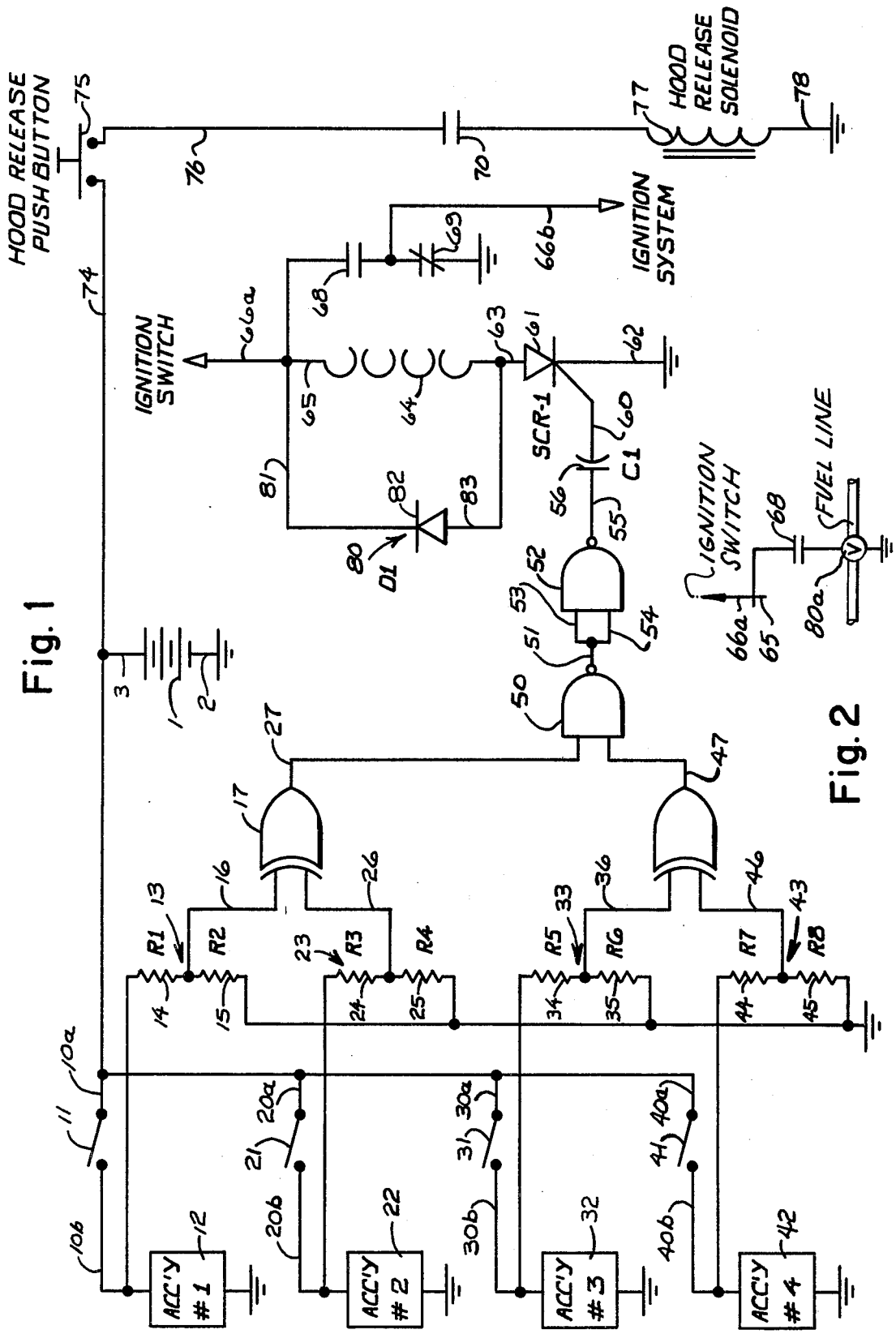

ANTI-THEFT DEVICE FOR MOTOR VEHICLES

BACKGROUND

This invention relates to an anti-theft device for motor vehicles, and more particularly to a small unnoticeable device that renders the motor inoperable until the operator satisfies a pre-determined set of conditions.

The problem of automobile thefts is well recognized and constitutes a significant problem. Many of the automobiles are never recovered. Others are recovered in damaged or stripped condition.

More recently, the hijacking or theft of loaded trucks has been a problem of increasing seriousness. While these vehicles are usually recovered, the valuable cargoes are usually not.

A wide variety of devices have been suggested to deter such thefts. For example, U.S. Pat. Nos. 3,930,226 and 3,858,175 show devices which sound the horn of the vehicle when someone tampers with the door, hood, gas tank or auxiliary switch. However, this device is disabled when the ignition switch is turned on and would be totally ineffective against a thief who had access to keys or who could "pick" the ignition switch lock. Moreover, the horn could obviously be silenced simply by disconnecting or cutting the wire.

Other devices with hidden switches or locks for deactivating an alarm or "protection" system have been suggested, as for example by U.S. Pat. Nos. 4,107,543 and 3,750,430.

Numerous combination or sequence type devices have also been suggested; e.g. by U.S. Pat. Nos. 3,544,804; 3,691,396; 3,818,436; and 4,064,547. However, each of these devices includes a keyboard or one or more dials which immediately give away the presence of the device. The experienced thief can then quickly re-route or bypass the protective mechanism.

SUMMARY OF THE INVENTION

The instant invention provides a very small, unnoticeable unit which is easy to install and convenient to reset. Protection of the engine compartment and protection against "hot wiring" or "jumping" is easily included. Power consumption is negligible.

More specifically, my invention includes a relay-operated device which renders the ignition inoperable. An integrated circuit of the Exclusive OR Gate type is arranged to control power to the relay and thus render the ignition operable. Inputs of the integrated circuit are connected to at least two of the accessories usually present in a motor vehicle. When the switch controlling one of these accessories is on and the other off, the relay is activated to render the ignition operable. Once the motor is operating, the accessory switches can be reset without stopping the motor. In this way, the motor, when stopped, is again inoperable until the "combination" is reset by again turning on one of the two accessories and turning off the other.

THE DRAWINGS

FIG. 1 is a schematic diagram of an anti-theft device incorporating the invention.

FIG. 2 is a partial view showing a modification.

DETAILED DESCRIPTION

With reference to the drawing, power is supplied to the motor vehicle's electrical system by the battery 1, the negative terminal 2 of which is customarily grounded. Alternatively, power may of course be supplied by a generator, alternator or magneto. The positive terminal 3 of battery 1 is connected by lead wires to the switch lead wires 10a, 20a, 30a and 40a, each of which provides power to one of the accessory switches 11, 21, 31 and 41. The accessory switches 11, 21, 31 and 41 are, of course, the standard switches present on any vehicle for the purpose of turning on a radio, heater, light, turn indicator, horn, tailgate motor, air conditioner or other electrical accessory or appliance. Special switches are not needed, so that the presence of the anti-theft device is not disclosed by their presence. If desired, the ignition switch can be located in series in the line between the positive terminal 3 and the lead wire 74.

Accessory lead wires 10b, 20b, 30b and 40b connect switches 11, 21, 31 and 41 to the first, second, third and fourth accessories 12, 22, 32 and 42, respectively, which may be any of the electrical accessories or appliances present on the particular vehicle. Such accessories are customarily grounded to complete the circuit. Between the switches 11, 21, 31 and 41 and the respective accessories, lead wires connect the accessory lead wires 10b, 20b, 30b and 40b to the voltage dividers 13, 23, 33 and 43.

Voltage divider 13 includes a first resistor (R1)14 and a second resistor (R2)15 of approximately equal resistance. The two resistors are connected in series and one end of resistor 15 is connected to ground to complete the circuit. The node or junction between resistances 14 and 15 is connected to the first input 16 of a transistor-transistor-logic (TTL) integrated circuit 17 of the Two-Input Exclusive OR Gate type. A unit sold by Texas Instruments as Catalog No. SN7486, in particular, has proven satisfactory.

Voltage divider 23 includes a first resistor (R3)24 and a second resistor (R4)25, one end of which is grounded. The node between the two resistors is connected to the second input 26 of the TTL integrated circuit 17.

In like manner, voltage divider 33 consists of two resistors 34, 35 and the node between them is connected to the first input 36 of a second TTL integrated circuit 37 of the Two-Input Exclusive OR Gate type. The node between resistor 44 and resistor 45 is connected to the second input of TTL circuit 37.

The output 27 of TTL circuit 17 is connected to the first input of the transistor-transistor-logic (TTL) integrated circuit 50 and the output 47 of TTL circuit 37 is connected to the second input of integrated circuit 50. Circuit 50 is of the 2-Input, positive-NAND Gate type, as for example, the model SN7400 marketed by Texas Instruments.

The output 51 of circuit 50 is connected to both inputs 53 and 54 of the TTL integated circuit 52. This circuit is also of the 2-Input, positive-NAND Gate type, but is connected so that it serves as an inverter. The output 55 of circuit 52 is connected to capacitor 56, which is connected by lead wire 60 to the gate of the silicon controlled rectifier (SCR) 61. With some types of SCRs, a capacitor is not needed and output 55 is connected directly to the gate. The cathode of SCR 61 is grounded through lead wire 62 and the anode is connected to one terminal of relay coil 64. A second terminal of relay coil 64 is connected by lead wire 65 to the wire 66a leading from the ignition switch to the ignition system.

Wire 66a is interrupted by a normally open relay switch 68, which is activated (closed) by current passing through relay coil 64. One terminal of normally closed relay switch 69 is connected to ignition wire 66a and the other terminal to ground. Relay switch 69 is activated (opened) by current passing through relay coil 64.

While it is not essential to operation of my anti-theft device, it is desirable to provide a diode 80, connected by lead wires 81 and 83, and having a cathode 82 across relay coil 64 in order to protect the SCR 61 against a high transient voltage (surge) when the ignition switch is turned off. Alternatively, a capacitor can be used.

Although my anti-theft device as described will effectively protect a vehicle against theft, it can be located, whether installed in the car or under the hood, and can be removed. It is therefore desirable to further protect the vehicle by modifying the hood latch so that it too can be operated only when the proper combination of accessory switches has been set. This may be accomplished by providing power from the positive terminal of battery 1 through lead wire 74, the hood release switch 75 and lead wire 76 to one terminal of hood release solenoid 77. The other terminal of solenoid 77 is grounded through lead wire 78 to complete the circuit. Lead wire 76 is interrupted by normally open relay switch 70 which is activated (closed) by current passing through relay coil 64.

In operation, my anti-theft device is activated automatically when the accessory switches are not set in a particular, specified manner. To operate the vehicle, it is then necessary to turn on certain pre-determined switches, but to leave certain other switches in the off position.

In the embodiment shown in the drawing, accessory switch 11 may be either on or off, but accessory switch 21 must be off if switch 11 is on and vice versa. If switch 11 is on, wire 10b is charged with a 12 volt potential. This potential is divided by voltage divider 13 to provide a potential of approximately 6 volts to input 16 of the TTL integrated circuit 17. This satisfies one of the two criteria for circuit 17 to provide a high potential at output 27.

If the second accessory 22 is turned on by closing switch 21, then the 12 volt potential of lead wire 20b is split by voltage divider 23 and a 6 volt potential is applied to input 26 of the TTL integrated circuit 17. Since 17 is an Exclusive OR Gate, the 6 volt potential on the second input prevents opening of the Gate. Switch 21 must therefore be in the open or off position to satisfy the second criterion for circuit 17 to provide a high potential at output 27.

In a similar manner, one of the third and fourth accessories 32 and 42 must be turned on and one must be turned off. For example, switch 31 of accessory 32 might be left in open or off position. Input 36 of the TTL integrated circuit 37 would then not be charged with a positive potential through lead wire 30 and resistor 34. It would then be necessary to turn on the fourth accessory 42 in order to inactivate the anti-theft device.

When switch 41 was turned on, the 12 volt potential in lead wire 40b would provide a 6 volt potential at the node or center terminal of voltage divider 43 and this potential would be applied to the second input 46 of the TTL integrated circuit 37. This would satisfy the second criterion for circuit 37 to provide a high potential at output 47.

The high potential of output 27 is applied to the first input of circuit 50 and the high potential of output 47 is applied to the second input of circuit 50. Since circuit 50 is one of the 2-Input, positive-NAND Gate type, high potentials on both inputs result in the desired low potential for output 51. If either of the inputs of circuit 50 have low potentials, a low potential for output 51 will not be achieved.

The low potential output 51 then provides a low potential for inputs 53 and 54 of circuit 52 which are both connected to output 51. This arrangement causes circuit 52 to serve as an inverter and to provide a high potential at output 55. Other types of inverters of course may be used. The high potential of output 55 is then applied to capacitor 56, which stores up energy until the gate of the silicon controlled rectifier (SCR) 61 can be satisfied. This allows current to pass, when the ignition switch is turned on, through lead wire 65, relay coil 64, and the SCR 61 to ground. When current passes through relay coil 64, normally open relay switches 68 and 70 are closed and normally closed relay switch 69 is opened. Closing of relay switch 68 allows current to pass from the ignition switch through lead wire 66a to the ignition system and renders the vehicle operable. The accessory switches may then be reset and do not cause the relay switch 68 to open. Thus, the vehicle remains operable until the ignition switch is turned off. When this occurs, the potential on both sides of the SCR is equalized, the gate potential disappears and the relay switch 68 is "unlatched." Because of this feature, the on position of the backup lights or other such accessory can be used in the pre-determined combination, even though the switch usually must be in the off position (gear shift in neutral or park) in order to start the motor.

Since inactivation of my anti-theft device depends on certain accessory switches being turned on, the question naturally arises as to its function if the fuses are located in the engine compartment and the fuse associated with one of the pre-determined accessories burns out. It should be noted, however, that the combination is satisfied in the case of each pair by having one off and one on and these can be exchanged within the pair. For example, if accessory 1 was the radio and accessory 2 was the dome light, the combination for this group would then be met by having the radio on and the dome light off. But if the radio fuse burned out, the combination could be satisfied by having the radio off and the dome light on.

Normally closed relay 69 provides additional protection by grounding out the ignition system until opened. Thus, if a thief attempts to "hot wire" a vehicle by connecting the positive terminal 3 of the battery directly to the primary side of the ignition coil, relay 69 in its normally closed condition, will ground out the ignition system and prevent starting of the motor. If desired, the horn or other alarm device can be connected in series with and between relay 69 and ground, so as to provide an alarm if attempts are made to "hot wire" the vehicle.

When closed, relay 70 completes the connection from the hood release switch 75 to the hood release solenoid 77. As a result, the hood can be released merely by closing switch 75 to activate solenoid 77. When relay 70 is in its normally open position (relay coil 64 inactivated), current will not pass through solenoid 77 and the hood cannot be opened by the solenoid.

Although the embodiment of my anti-theft device described above is particularly designed for use with the usual gasoline engine, it can also be used with diesel powered engines. As shown in FIG. 2, relay switch 68 would be arranged to open the electrically operated fuel valve 80 available on many such engines, and relay switch 69 would be eliminated.

With the aid of modern integrated circuitry, my device can be made as a very small unit, assembled from standard, readily available components. The entire assembly can be housed in a 2"×2"×4" metal box which is easily and inconspicuously mounted in the engine compartment.

In the foregoing description, a specific example has been used to illustrate the invention. However, it is understood by those skilled in the art that certain modifications can be made to this example without departing from the spirit and scope of the invention.

I claim:

1. In a motor vehicle having a basic electrical circuit, at least two switch-operated accessories and lead wires connecting each switch to the respective accessory, an anti-theft device comprising relay-operated means rendering said vehicle ignition inoperable; a transistor-transistor-logic integrated circuit of the two-input Exclusive OR Gate type having first and second input terminals and an output terminal, the first of said input terminals being electrically connected to the lead wire of one of said accessories and the second of said input terminals being electrically connected to the lead wire of the second of said accessories; and a normally open relay switch operably connected to said output terminal and arranged to activate said relay-operated means so as to inactivate the means rendering the vehicle ignition inoperable when one of said accessories is turned on and the other of said accessories is turned off.

2. An anti-theft device as set forth in claim 1, having a third and a fourth switch-operated accessory with lead wires connecting each switch to the respective accessory; a second integrated circuit of the Exclusive OR Gate type having two input terminals and one output terminal, the first of said input terminals being electrically connected to the lead wire of the third accessory and the second of said input terminals being electrically connected to the lead wire of the fourth accessory; a third integrated circuit of the positive-NAND Gate type having two input terminals and one output terminal interposed between the output terminal of the first integrated circuit with one input terminal connected thereto and the relay switch with the output connected thereto, the second input terminal of said third integrated circuit being connected to the output terminal of the second Exclusive OR Gate type circuit, and an inverter connected to the output of the third integrated circuit and having its output operably connected to the normally open relay switch.

3. An anti-theft device as set forth in claim 2 wherein the inverter is an integrated circuit of the 2-input positive-NAND Gate type and the two input terminals are electrically connected to each other and to the output terminal of the third integrated circuit.

4. An anti-theft device according to claim 1 in which a capacitor and a silicon controlled rectifier are interposed between the output terminal of the integrated circuit and the relay switch, one plate of said capacitor being connected to said output terminal; the rectifier having a gate connected to the other plate of the capacitor, its cathode connected to ground and its anode connected through the coil of the relay switch to the ignition switch.

5. An anti-theft device as set forth in claim 1 wherein the relay-operated means rendering the vehicle ignition inoperable is a switch interrupting the wire connecting the ignition switch to the ignition system.

6. An anti-theft device as set forth in claim 1 wherein the relay-operated means rendering the vehicle ignition inoperable is a normally closed valve in the fuel line between the tank and the motor.

7. An anti-theft device as set forth in claim 5 having a means to prevent hot wiring of the vehicle comprising a normally closed relay switch operably connected to said output terminal and connecting the wire from a point between the switch interrupting the wire and the ignition system to ground.

8. An anti-theft device for a vehicle having a hood latch as set forth in claim 1 having a solenoid adapted to release said hood latch, a solenoid switch for activating said solenoid and a second normally open relay switch operably connected to said output terminal and located between the solenoid and the solenoid switch.

9. In a motor vehicle having a basic electrical circuit, at least two accessory switches which normally can be turned on or off without affecting the operation of the ignition when the motor is running, and lead wires connecting each switch to an accessory, an anti-theft device comprising relay-operated means normally rendering the ignition of said vehicle inoperative; a normally open relay switch arranged to inactivate when closed, the means rendering the ignition inoperative; means activating said relay switch when one of said accessory switches is turned on and means for inactivating said relay switch when a second accessory switch is turned on.

10. In a motor vehicle having a hood latch, a basic electrical circuit, at least four accessory switches and lead wires connecting each switch to an accessory, an anti-theft device comprising relay-operated means normally rendering the ignition of said vehicle inoperable; a first transistor-transistor-logic integrated circuit of the Exclusive OR Gate type having two input terminals and an output terminal, the first of the input terminals being electrically connected to the lead wire of one of said accessories, the second of the input terminals being connected to the lead wire of a second accessory; a second integrated circuit of the Exclusive OR Gate type having a first input terminal connected to the lead wire of a third accessory and a second input terminal connected to the lead wire of a fourth accessory; a third integrated circuit of the positive-NAND Gate type having a first input terminal connected to the output of the first integrated circuit and a second input connected to the output of the second integrated circuit; a fourth integrated circuit of the positive-NAND Gate type having two inputs linked together and connected to the output of the third circuit; a capacitor having a first plate connected to the output of the fourth integrated circuit; a silicon controlled rectifier having a gate connected to a second plate of said capacitor, a cathode connected to ground and an anode; a relay coil connected at one end to the anode of the rectifier and at the other end to a lead wire connecting the ignition switch to the ignition system; a normally open relay switch interrupting said wire, said switch being operably associated with said relay coil so as to close the switch when current passes through said coil; a normally closed relay switch also operable by said relay coil connecting said wire at a location between the normally open relay switch and the ignition system to ground; a solenoid arranged to release the hood latch of the vehicle; a switch for activating said solenoid; and a second normally open relay switch operable by said relay coil and located between the solenoid and the solenoid switch.

11. An anti-theft device as set forth in claim 9 wherein the primary function of said switches is to control a standard electrical device normally present in motor vehicles whereby the presence of said switches does not disclose the presence of anti-theft device.

12. An anti-theft device as set forth in claim 11 wherein said switches control an electrical device selected from the group consisting of a radio, heater, light, turn indicator, tailgate motor, or air conditioner.

* * * * *